(12) United States Patent
Kuechler

(10) Patent No.: US 6,371,011 B1
(45) Date of Patent: Apr. 16, 2002

(54) FAST PRODUCTION SMOKELESS BROILER

(76) Inventor: Irvin R. Kuechler, 172 E. 27$^{th}$ St., San Bernardino, CA (US) 92404

( * ) Notice: Subject to any disclaimer, the term of this patent is extended or adjusted under 35 U.S.C. 154(b) by 0 days.

(21) Appl. No.: 09/813,409

(22) Filed: Mar. 19, 2001

(51) Int. Cl.$^7$ .......................... A47J 27/00; A47J 37/00; F24C 3/00
(52) U.S. Cl. .......................... 99/400; 99/401; 99/425; 99/445; 99/446; 99/447; 99/126; 99/41 R; 99/51
(58) Field of Search .......................... 99/339, 340, 375, 99/385–391, 400, 401, 422, 425, 444–450, 481, 482, 517; 126/41 R, 41 A, 51, 39 BA; 219/401, 494

(56) References Cited

U.S. PATENT DOCUMENTS

| | | | | |
|---|---|---|---|---|
| 2,097,793 A | * | 11/1937 | Howell | 99/446 |
| 3,568,590 A | * | 3/1971 | Grice | 99/447 |
| 3,745,912 A | * | 7/1973 | Field | 99/447 |
| 3,805,688 A | * | 4/1974 | Gvozdjak | 99/425 X |
| 3,938,431 A | * | 2/1976 | Potvin | 99/375 |
| 3,964,378 A | * | 6/1976 | Dunkelman | 99/375 |
| 4,598,634 A | * | 7/1986 | Van Horn, II | 99/400 |
| 4,608,917 A | * | 9/1986 | Faaborg | 99/400 |
| 4,650,968 A | * | 3/1987 | Williams | 219/401 |
| 4,805,588 A | * | 2/1989 | Reynolds | 126/51 |
| 4,899,724 A | | 2/1990 | Kuechler | |
| 4,936,202 A | * | 6/1990 | Lin | 99/446 |
| 5,117,747 A | | 6/1992 | Kuechler | |

* cited by examiner

Primary Examiner—Timothy F. Simone
(74) Attorney, Agent, or Firm—Sheldon & Mak

(57) ABSTRACT

A broiler for fast production broiling of meat products with low levels of pollutant emissions incorporates liquid-cooled trough members that are spaced above respective horizontally spaced radiant elements under a grill for directing grease onto a drip pan that is also liquid-cooled. The radiant elements are heated by respective gas burner tubes that have outwardly inclined gas ports that are directed toward sloping sheet portions of the radiant elements, with convective flow being directed upwardly between vertically oriented flue portions and outwardly from the flue portions by horizontally oriented shield elements that are spaced between the radiant elements and the trough members.

21 Claims, 3 Drawing Sheets

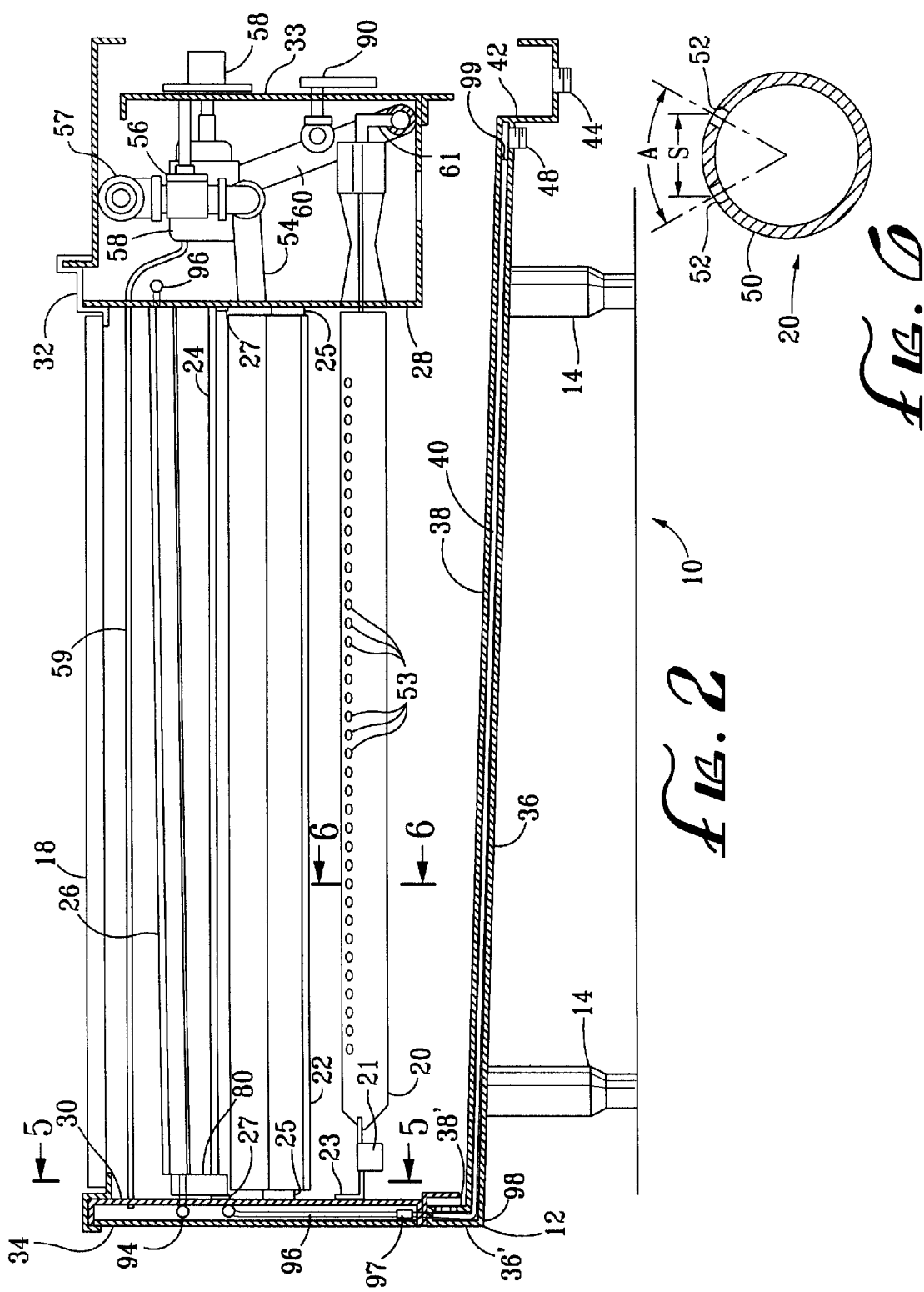

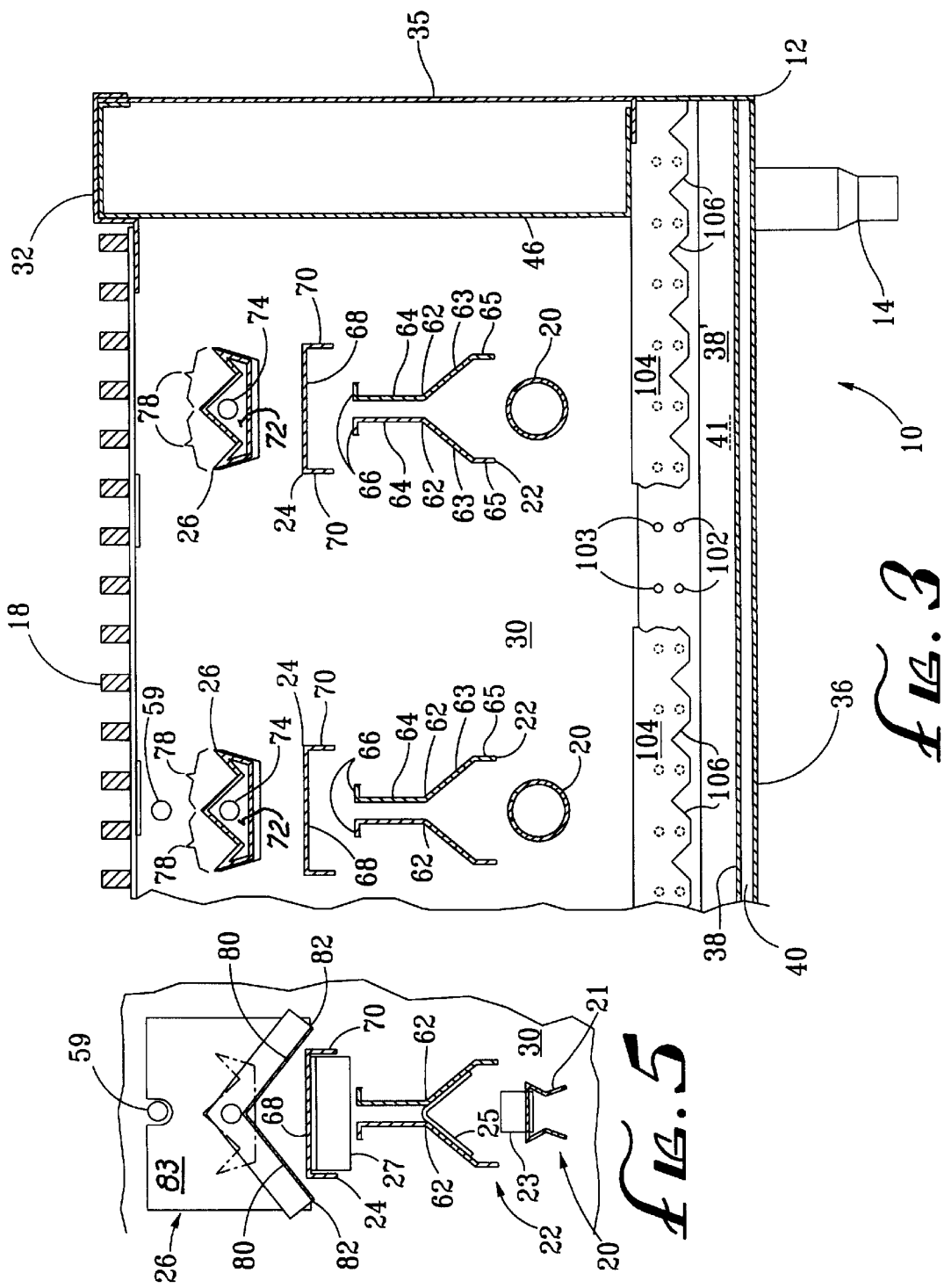

FAST PRODUCTION SMOKELESS BROILER

BACKGROUND

The present invention relates to gas heated broilers for meat products and the like, and more particularly to apparatus and methods for reducing harmful emissions of smoke having pollutants such as grease and other hydrocarbons entrained therein.

Broiler smoke is often objectionable, producing eye irritation and other discomforts, as well as blocking clear view of cooking in progress. Also, recent regulations in many jurisdictions impose limits on airborne particulate and other pollutant concentrations in restaurants and other places that operate broilers, with consequent requirements for pollution control equipment. For example, the Southern California Air Quality Management District (SCAQMD) generally requires permits and registration fees for commercial broiler operation, and the use of Best Available Control Technology (BACT) emissions control equipment.

Broilers having provisions for reducing the production of smoke are known, being disclosed in U.S. Pat. Nos. 4,899,724 and 5,117,747 to this inventor, which are incorporated herein by these references. These devices of the prior art have significant advantages in reducing grease-laden smoke in restaurants and other environments where broiling of meat is practiced. The '724 patent discloses a broiler having inverted V-shaped radiant heat transmitting elements or radiants positioned above respective gas burner tubes of the broiler, and a thermostatically controlled regulator for controlling the temperature of a cooking zone of the broiler. The '747 patent discloses a broiler having laterally spaced grill sections, burner tubes spaced below and between the grill sections, inverted V-shaped radiants above the burner tubes, deflector members above the radiants for deflecting converted heat laterally outwardly onto the grill sections, and baffle elements above the deflector elements and between the grill sections for preventing grease from dripping onto the deflector elements. Also, an inclined drip pan is located below the burner tubes, and water is circulated in contact with the underside of the drip pan to the upper extremity, the water trickling downwardly on top of the drip pan to carry away drippings from beneath the grill sections. Unfortunately, these devices also have a number of disadvantages; for example:

1. They are expensive to provide, particularly when configured with multiple grill sections;
2. They have objectionably non-uniform heat distribution across the grill sections, particularly when the broilers are configured with wide grill sections and correspondingly extended spacing of the burner tubes in order to reduce manufacturing costs;
3. They are unsightly, particularly when not in use carrying a load; and
4. They are ineffective in that cooking is slow.

Thus there is a need for a vehicle cargo carrier that overcomes the disadvantages of the prior art.

SUMMARY

The present invention meets this need by providing a broiler that is particularly effective for fast production without producing flaming grease or smoke clouds, yet is relatively inexpensive to provide. The broiler includes a cabinet structure having an upwardly facing grill opening; a grill extending across the grill opening for supporting the meat products; an elongate heating element spaced below the grill; an elongate radiant element spaced between the heating element and the grill for directing heat laterally from above the heating element; an inclined trough member having a coolant passage being spaced between the grill and the radiant element for preventing grease from dripping on the radiant element and the heating element; means for feeding liquid coolant through the coolant passage; and means for directing grease from a lower end of the trough member to a region below the heating element without contacting either of the radiant element and the heating element. The coolant passage can extend from an inlet port preferably located at the lower end of the trough member to an outlet port at an opposite upper end of the trough member for counterflow of the liquid coolant relative to grease traveling in the trough member toward the lower end thereof. Preferably the inlet and outlet ports of the coolant passage are laterally centered relative to the trough member, a laterally spaced pair of trough surfaces being formed therein, the outlet port being located proximate an upper end extremity of the coolant passage for facilitating maintenance of the coolant passage in a filled condition.

The means for directing grease from the lower end of the trough member can include a laterally downwardly sloping chute member, or a pair of oppositely laterally downwardly sloping chute members for receiving grease from the pair of trough surfaces, exit extremities of the chute members being spaced laterally beyond side extremities of the heating element and the radiant element.

Preferably the broiler includes a heat sensor for sensing temperature of a region proximate the grill, and a control device for controlling heat flow from the heating element in response to the heat sensor. The heating element can include a gas burner tube. Preferably the burner tube has respective gas emitting ports oppositely inclined laterally outwardly and upwardly for producing a spaced pair of outwardly and upwardly directed flames. The gas emitting ports can be configured as respective rows of openings. The gas emitting ports preferably an included angle of inclination being between 30 degrees and 90 degrees and a lateral port spacing of between 0.4 inch and 1.0 inch. More preferably. the included angle is approximately 60 degrees and the lateral port spacing is approximately 0.6 inch. Preferably the burner tube has an inlet end and a closed end, the closed end being under the lower end of the trough member for facilitating direction of the grease from the trough member away from hotter regions of the broiler.

The radiant element can include a laterally spaced pair of sheet members, respective main portions of the sheet members preferably sloping upwardly and inwardly for directing radiant heat upwardly and outwardly from the heating element. Preferably the radiant element has respective flue portions of the sheet members extending vertically upwardly from upper extremities of the main portions for producing upward convective flow over the sheet members. Preferably a shield element is spaced between the radiant element and the trough member for limiting heating of the trough member. The shield element can include a horizontally oriented strip, which preferably has a pair of downwardly extending lips formed along side extremities of the strip for redirecting the convective flow outwardly and downwardly from upper extremities of the radiant element sheet members.

Preferably the broiler also has a sloping drip pan spaced below the heating element; a grease collector for collecting grease from a lower extremity of the drip pan; and means for feeding the liquid coolant from the coolant passage in contact with a bottom surface of the drip pan for cooling the drip pan, the liquid overflowing onto a top surface of the drip pan for washing grease into the grease collector. The means for feeding the liquid coolant can include a plenum chamber formed under the drip pan, and a coolant conduit having an outlet located in the plenum chamber near a lower extremity of the drip pan, the coolant conduit being connected to coolant passage of the trough member. Typically there are horizontally spaced plural counterparts of the heating element, the radiant element, the shield element, and the trough member.

DRAWINGS

These and other features, aspects, and advantages of the present invention will become better understood with reference to the following description, appended claims, and accompanying drawings, where:

FIG. 2 is a sectional view of the broiler apparatus of FIG. 1 on line 2—2 thereof;

FIG. 3 is a sectional view on line 3—3 in FIG. 1;

FIG. 5 is a sectional view of the broiler apparatus of FIG. 1 on line 5—5 of FIG. 2; and FIG. 6 is a sectional view on line 6—6 in FIG. 2.

DESCRIPTION

Figure 1:
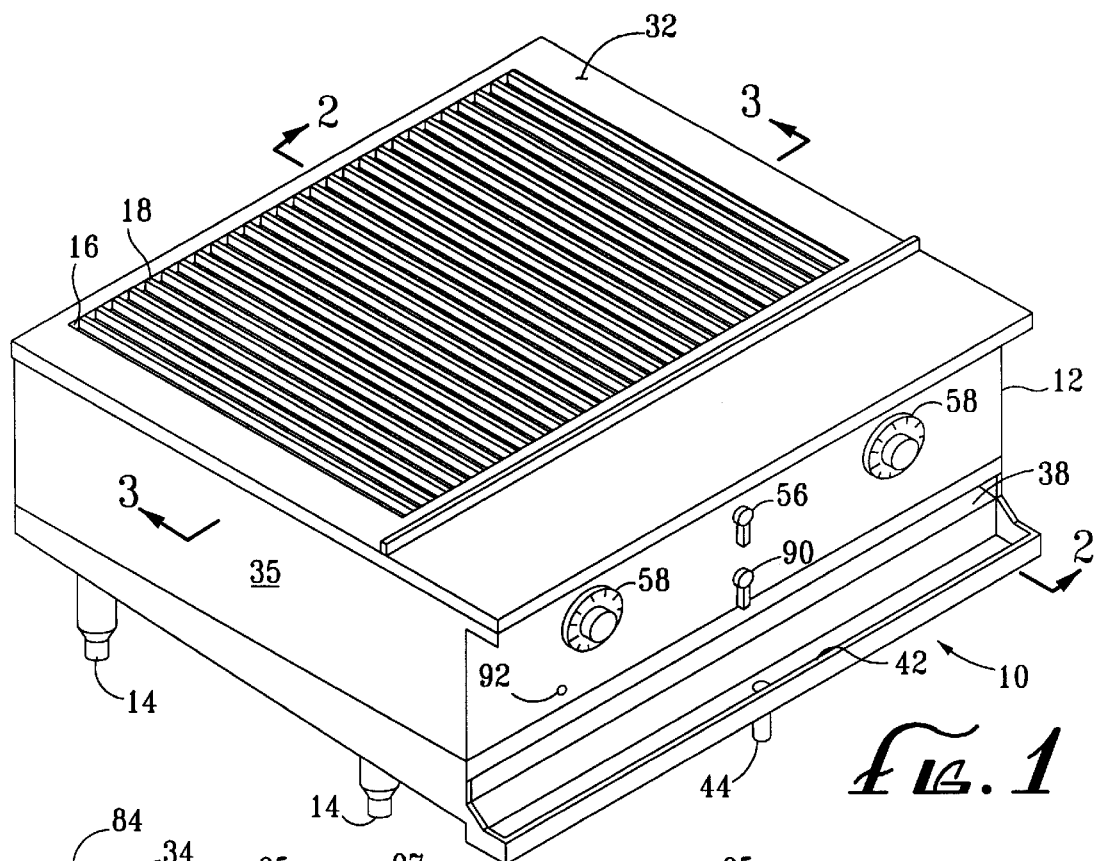
FIG. 1 is a perspective view of a broiler apparatus according to the present invention.

The present invention is directed to a broiler apparatus that is particularly effective for fast production broiling of meat products without producing flaming grease or clouds of smoke. With reference to FIGS. 1–6 of the drawings, a broiler 10 includes a cabinet 12 having legs 14 and an upwardly facing grill opening 16, a grill 18 being supported approximately flush with the opening 16. Horizontally spaced pluralities of heating elements 20, radiant elements 22, shield elements 24, and trough members 26 are vertically spaced in upwardly ascending order under the grill 18 as best shown in FIGS. 2 and 3, opposite ends of these components being supported between a front bulkhead 28 and a rear bulkhead 30 of the cabinet 12 as shown in FIG. 2, a longitudinal plan orientation of the components 20, 22, 24, and 26 being perpendicular to the bulkheads 28 and 30. As shown in FIGS. 2 and 5, rear portions of the heating elements 20 each have a clip member 21 that is supported on an L-shaped bracket 23 being affixed to the rear bulkhead 30, inverted V-shaped brackets 25 also being affixed to the bulkhead 30 for supporting respective rear extremities of the radiant elements 22, and further L-shaped brackets 27 being affixed to the bulkhead 30 for supporting rear extremities of the shield elements 24. Front extremities of the radiant and shield elements 22 and 24 are similarly supported by the front bulkhead 28 on counterparts of the brackets 25 and 27, while front extremities of the heating elements 20 are differently supported as described below. The trough member 26 is also supported as described below. It will be understood that any suitable means for supporting the elements 20, 22, and 24, as well as the trough members 26 may be employed within the scope of the present invention.

The cabinet 12 also includes a top wall 32 having the grill opening 16 formed therein, front and rear walls 33 and 34, side walls 35, and a bottom wall 36. The bottom wall 36 slopes downwardly toward the front, and a drip pan 38 is supported in parallel-spaced relation slightly above the bottom wall to form a liquid-tight plenum chamber 40 therebetween. The drip pan 38 and the bottom wall 36 are each formed with upwardly extending rear extremities, respectfully designated 38' and 36' as shown in FIG. 2, creating an overflow region 41 of the plenum chamber 40 that is further described below in connection with FIG. 3.

Figure 4:
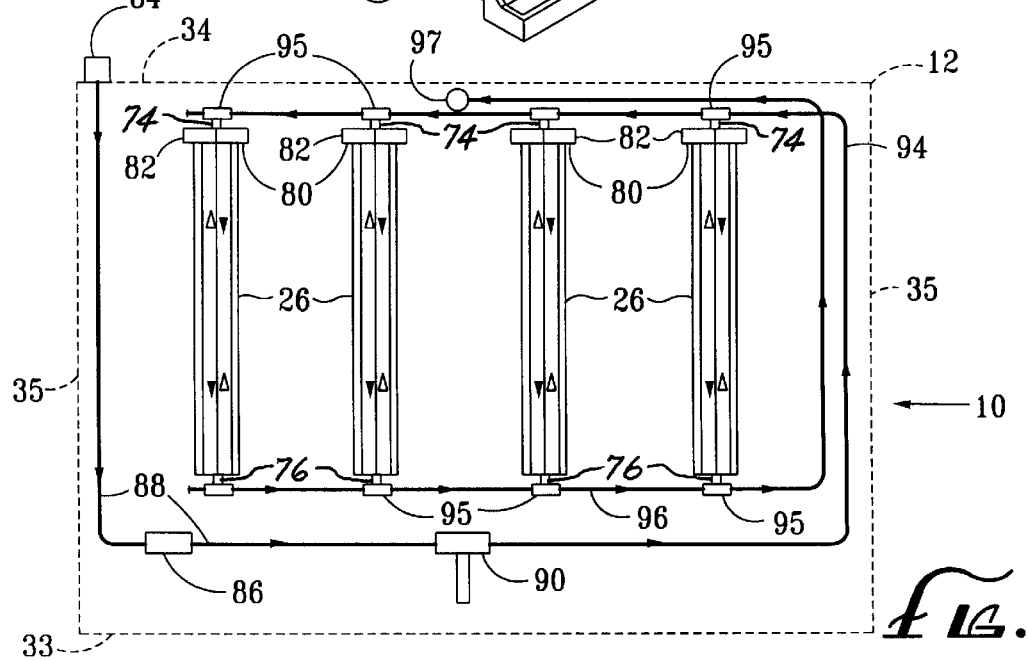
FIG. 4 is a plan diagram showing liquid coolant flow in the broiler apparatus of FIG. 1.

A grease collector 42 extends across the front of the cabinet 12 for receiving liquids and other matter from the forwardly sloping drip pan, the collector 42 having a collector outlet 44 for feeding a conventional grease trap or grease holding device. The front wall 33 is recessed for protectively accommodating various control elements that are described below. Additionally, a pair of side bulkheads 46 are spaced inwardly from the side walls 35 for reinforcing the top wall 32, and for providing a degree of thermal isolation for the side walls 35, the bulkheads 28 and 30 similarly thermally isolating the front and rear walls 33 and 34. Further, a normally plugged plenum drain 48 is formed in the bottom wall 36 proximate the grease collector 42. As indicated in FIG. 4, there are four of the trough members 26 arranged in equally laterally spaced relation between the side walls 35 of the cabinet 12, with the same number of the shield elements 24, radiant elements 22, and heating elements 22 being spaced out of view below the trough members 26. It will be understood that other numbers of these components are contemplated, depending on the size (primarily the width) of the grill 18.

In an exemplary and preferred configuration of the broiler 10, the heating elements 20 are implemented as respective gas burner tubes 50, each of the burner tubes having oppositely inclined gas emitting ports 52 extending longitudinally therein, the ports being formed by respective rows of openings 53. The ports 52 of each burner tube 50 are laterally spaced apart by a distance S, the inclination thereof being indicated by the included angle A in FIG. 6. The angle A can be between approximately 30 degrees and approximately 90 degrees, a preferred angle being 60 degrees (30 degrees on opposite sides of a top centerline). Preferred values of the spacing S are from approximately 0.4 inch to 1.0 inch, approximately 0.6 inch being more preferred. Coincidentally, when the angle A is 60 degrees and the spacing S is 0.55 inch, the ports 52 are approximately aligned with a centerline of the burner tubes 50. This facilitates manufacture of the burner tubes 50 by forming the ports 52 as the port openings 53 by punching. It will be understood that additional gas ports 52 can be provided in the burner tube 50 at other angles of inclination. The rows of openings 53 forming the ports 52 are preferably closely spaced, having a center-to center spacing of approximately 0.140 inch, for example, and being approximately 0.070 inch in diameter.

The burner tubes 50 are fed from a suitable source of flammable gas (not shown) by a supply line 54 that is connected through a shut-off valve 56 and branching by a T-fitting 57 through a pair of thermostat valves 58 to respective burner manifolds 60. Each of the thermostat valves 58 has a temperature sensor 59 connected thereto, the sensors 59 being located under the grill 18 appropriately for monitoring broiler temperatures above a group of the burner tubes 50 that are fed by the connected thermostat valves 58. Equal numbers of the burner tubes 50 are connected to respective ones of the burner manifolds 60, mechanical support and fluid connection to an inlet end of each of the burner tubes 50 (proximate the front wall 33) being provided by a corresponding elbow fitting 61. Opposite closed ends of the burner tubes 50 are supported from the rear bulkhead 28 by the clip members 21 engaging the L-shaped brackets 23 as described above. Thus there are two of the burner tubes 50 that are fed from each of the manifolds 60. It will be understood that other numbers of the thermostat valves 58 and burner manifolds 60, depending on the number of independently controllable heating zones, are contemplated to be provided in the broiler 10. Normally, there are equal numbers of the burner tubes 50 connected to each of the manifolds 60. The thermostat valves 58, which are commercially available from a variety of sources, are provided with appropriate pilot systems (not shown) for automatic ignition of the heating elements 20.

Each of the radiant elements 20 includes a pair of sheet members 62, each of the sheet members having a downwardly and laterally outwardly sloping main portion 63, and a flue portion 64 that extends vertically upwardly from an upper extremity of the main portion, the flue portions 64 being laterally spaced apart for promoting upward convectional flow therebetween from the associated heating element 20. Additionally, each of the sheet members is formed with a lower flange portion 65 that projects downwardly from a lower extremity of the main portion 63, and an upper flange portion 66 that extends laterally outwardly from an upper extremity of the flue portion 64. The pair of sheet members 62 are joined in spaced relation by suitable spacers and threaded fasteners (not shown) to form each radiant 20 as an assembly. It will be understood that the sheet members 62 can be separately supported between the bulkheads 28 and 30, and that the sheet members 63 can be integrally formed with portions of a single panel forming bridge connections between respective counterparts of the sheet members 62. In any case, suitable materials for the radiant elements 20 include steel sheet metal, which can be mild steel or, preferably, stainless (corrosion resistant) steel.

Each of the shield elements 24 is formed as a horizontally extending main strip portion 68, a pair of laterally spaced flange portion 70 projecting downwardly from side extremities of the main strip portion 68. The combination of the heating elements 20, the radiant elements 22, and the shield elements 24 provide a number of advantages in the broiler 10 of the present invention. For example, the laterally inclined pairs of gas ports 52 produce outwardly and upwardly directed flames that project toward the sloping main portions 63 of the radiant elements 22 for enhanced heating thereof and consequent high levels of radiant heating of the grill 18 in regions laterally displaced from the heating elements 20. Also, the laterally spaced flue portions 64 of the radiant elements 22 produce significant convective flow upwardly toward the shield elements 24, and the flange portions 70 of the shield elements cooperate with the upper flange portions 66 of the radiant elements 22 to form downwardly and laterally outwardly directed convective flow, for an advantageous laterally outwardly directed chimney effect.

Each of the trough members 26 is formed with a longitudinal coolant passage 72 extending between an inlet port 74 and an outlet port 76 that are opposite ends of the trough member, a laterally spaced pair of trough surfaces 78 being formed on an upper side of the trough member. The trough members 26 are supported in an inclined orientation between the bulkheads 28 and 30, the inlet ports 72 being at lower ends of the trough members and the outlet ports 74 being at upper ends of the trough members, the trough surfaces 78 being configured to direct grease and other matter falling onto the trough members to flow from lower end extremities of the trough surfaces, whereby a counterflow condition of the grease and a suitable liquid coolant is created when such coolant is caused to flow through the coolant passage 72 into the inlet port 72 and out of the outlet port 74 as shown in FIG. 3 and described below, the flow of coolant being indicated by solid arrows, the flow of grease being indicated by oppositely directed open arrows. Also, the ports 72 and 74 are centrally located between the trough surfaces 78, the outlet port being positioned proximate the top of the upper end extremity of the coolant passage 72 for facilitating maintenance of the passage in a filled condition. The inlet port 72 may be located close to the bottom of the lower end extremity of the coolant passage 72 for promoting convective flow of the liquid toward the outlet port 74. The location of the ports 74 and 74 symmetrically laterally centered between opposite sides of the trough member, with the outlet port 74 being close to the upper extremity of the coolant passage 72, which also extends to proximate upper extremities of the trough surfaces 78, also facilitates support of the trough members between the front and rear bulkheads 28 and 30 as described below.

A pair of downwardly and laterally outwardly projecting chute members 80 are provided at the lower ends of each of the trough members for receiving the grease from respective ones of the trough surfaces 78 as shown in FIGS. 2 and 5, respective exit extremities 82 of the chute members being spaced outwardly beyond outward extremities of the corresponding heating elements 20, the radiant elements 22, and the shield elements 24 for directing the grease onto the drip pan 38 without contacting those hotter components that are spaced below the trough members 26. Further, an enlarged end flange 83 is affixed against side flange portions of the chute members 80 for insuring against overflow of grease from the chute members onto the rear bulkhead 30. Thus the trough members 26 in cooperation with the chute members 80 advantageously prevent the grease and other matter from falling onto the heating elements 20, the radiant elements 22, and the shield elements 24, which are preferably maintained at temperatures sufficient to burn or char such grease. Additionally, the end flange 83 prevents the grease from seeping down and being charred on the rear bulkhead 28, the brackets 23, 25, and 27 and/or the elements 20, 22, and 24 being supported thereby. The trough members 26, being cooled according to the present invention, act as "cold bars" that collect and carry away grease that would otherwise fall onto the hot underlying radiant and shield elements 22 and 24 to be charred and burned. The flow of coolant through the trough members 26 advantageously allows the grease falling thereon to flow from the lower ends of the trough surfaces without excessive heating that would otherwise burn or char the grease on the trough surfaces 78.

As shown in FIG. 4, the liquid coolant is received as process water from a suitable pressure source (not shown) at a coolant inlet 84 that is located at the rear wall 24 of the cabinet 12, the coolant flowing through a metering valve 86 that is connected in an inlet line 88 behind the front wall 33 of the cabinet 12, the inlet line being connected to a coolant shut-off valve 90. The shut-off valve 90 is normally accessible by a user of the grill 10, the metering valve 86 being preferably configured for screwdriver adjustment through a small access opening 92 that is formed in the front wall 33 as shown in FIG. 1. From the shut-off valve 90, the coolant is directed through a feed manifold 94 to respective ones of the inlet ports 74 of the trough members 26 by corresponding manifold couplings 95, the trough members being oriented with the inlet ports, and the chute members 80, proximate the rear wall 34 of the cabinet 12. This arrangement advantageously provides the above-described counterflow of the liquid coolant in the coolant passages 72 relative to the grease flowing on the trough surfaces 78 with the chute members 80 being located away from the front of the cabinet so that grease falling from the exit extremities 82 does not splash out over the grease collector 42, and the grease falls a shorter distance onto rear portions of the forwardly sloping drip pan 38. The liquid coolant exiting the coolant passages 72 is collected from the front extremities of the trough members 26 by an outlet manifold 96 having counterparts of the manifold couplings 95 connected to the outlet ports 76. The manifold couplings 95 and/or the ports 72 and 76 project through the rear and front bulkheads 30 and 28, respectively, thereby providing mechanical support for the trough members 26 as well as the necessary fluid connections, this arrangement being facilitated by the high and laterally symmetrical locations of the ports 74 and 76 which results in the trough members 26 each having a center of gravity that is located vertically below a common axis of the inlet and outlet ports 74 and 76.

The outlet manifold 96 extends to proximate the rear wall 34, being connected by an outlet coupling 97 to an outlet line 98 that extends within the plenum chamber 40 to a coolant outlet 99 that is located proximate a forward and lowermost extremity of the chamber 40. The liquid coolant, having passed through the passages 72 of the trough members 26, thus fills the plenum chamber 40 from the bottom, creating an upward, rearward flow of the coolant in contact with the underside of the drip pan 38. As shown in FIG. 3, the upturned rear extremity 38' of the drip pan 38 has a row of exit openings 102 formed therein for allowing minute streams of the cooling water to flow from the overflow region 41 of the plenum chamber 40 and to be distributed across the drip pan 38, thereby to wash the grease and other matter into the grease collector 42. An additional row of overflow openings 103 is formed in the rear extremity 38' above the exit openings 102 for insuring unimpeded flow of the liquid coolant as adjusted by the metering valve 86. Also, an overhanging baffle flange 104 projects downwardly in front of the openings 103 and 104 for insuring that liquid flowing therefrom contacts the drip pan 38 proximate the rear extremity 38', particularly in case of steam being formed in the plenum chamber 40 should the flow of the coolant liquid be set to low by the metering valve 86. Further, the baffle flange 104 has a series of notches 106 formed therein for spreading any liquid that may spray from the openings 103 and 104, thereby insuring that liquid dripping therefrom is distributed evenly across the drip pan 38.

Although the present invention has been described in considerable detail with reference to certain preferred versions thereof, other versions are possible. For example, a movable door or panel can be provided as a draft diverter above the lower front extremity of the drip pan 38 for limiting the entrance of air in drafty environments. The draft diverter can be retracted to a raised horizontal position extending behind a lower extremity of the front panel 33 for facilitating cleaning of the drip pan. Therefore, the spirit and scope of the appended claims should not necessarily be limited to the description of the preferred versions contained herein.

What is claimed is:

1. A broiler for cooking meat products while limiting smoke production, comprising:

(a) a cabinet structure having an upwardly facing grill opening;

(b) a grill for supporting the meat products, the grill being supported across the grill opening;

(c) an elongate heating element spaced below the grill;

(d) an elongate radiant element spaced between the heating element and the grill for directing heat laterally from above the heating element;

(e) an inclined trough member spaced between the grill and the radiant element for preventing grease from dripping on the radiant element and the heating element, the trough member having a coolant passage formed therein;

(f) means for feeding liquid coolant through the coolant passage; and (g) means for directing grease from a lower end of the trough member to a region below the heating element without contacting either of the radiant element and the heating element.

2. The broiler of claim 1, wherein the coolant passage extends between opposite ends of the trough member and having an inlet port at the lower end of the trough member and an outlet port at an upper end of the trough member for counterflow of the liquid coolant relative to grease traveling in the trough member toward the lower end thereof.

3. The broiler of claim 2, wherein the inlet and outlet ports of the coolant passage are laterally centered relative to the trough member, the trough member having a laterally spaced pair of trough surfaces formed therein, the inlet and outlet ports being located proximate upper end extremities of the coolant passage for facilitating maintenance of the coolant passage in a filled condition.

4. The broiler of claim 3, wherein the means for directing grease from the lower end of the trough member comprises a pair of oppositely laterally downwardly sloping chute members for receiving grease from respective ones of the trough surfaces, an exit extremity of each chute member being spaced laterally beyond corresponding side extremities of the heating element and the radiant element.

5. The broiler of claim 1, wherein the means for directing grease from the lower end of the trough member comprises a laterally downwardly sloping chute member for receiving grease from the trough member, an exit extremity of the chute member being spaced laterally beyond side extremities of the heating element and the radiant element.

6. The broiler of claim 1, further comprising a heat sensor for sensing temperature of a region proximate the grill, and a control device for controlling heat flow from the heating element in response to the heat sensor.

7. The broiler of claim 1, wherein the heating element comprises a gas burner tube.

8. The broiler of claim 7, wherein the burner tube has respective gas emitting ports oppositely inclined laterally outwardly and upwardly for producing a spaced pair of outwardly and upwardly directed flames.

9. The broiler of claim 7, wherein the gas emitting ports are configured as respective rows of openings.

10. The broiler of claim 9, wherein the gas emitting ports have an included angle of inclination being between 30 degrees and 90 degrees and a lateral port spacing of between 0.4 inch and 1.0 inch.

11. The broiler of claim 10, wherein the included angle is approximately 60 degrees and the lateral port spacing is approximately 0.6 inch.

12. The broiler of claim 7, wherein the burner tube has an inlet end and a closed end, the closed end being under the lower end of the trough member.

13. The broiler of claim 1, wherein the radiant element comprises a laterally spaced pair of sheet members, respective main portions of the sheet members sloping upwardly and inwardly.

14. The broiler of claim 13, wherein the radiant element further comprises respective flue portions of the sheet members, the flue portions extending vertically upwardly from upper extremities of the main portions.

15. The broiler of claim 1, further comprising a shield element spaced between the radiant element and the trough member.

16. The broiler of claim 15, wherein the shield element comprises a horizontally oriented strip.

17. The broiler of claim 16, wherein the shield element further comprises a pair of downwardly extending lips formed along respective laterally spaced side extremities of the strip.

18. The broiler of claim 1, further comprising:
   (a) a sloping drip pan spaced below the heating element;
   (b) a grease collector for collecting grease from a lower extremity of the drip pan; and
   (c) means for feeding the liquid coolant from the coolant passage in contact with a bottom surface of the drip pan, the liquid coolant overflowing onto a top surface of the drip pan for washing grease into the grease collector.

19. The broiler of claim 18, wherein the means for feeding the liquid coolant comprises a plenum chamber formed under the drip pan, and a coolant conduit having an outlet located in the plenum chamber proximate the lower extremity of the drip pan, the coolant conduit being connected to coolant passage.

20. A broiler for cooking meat products while limiting smoke production, comprising:
   (a) a cabinet structure having an upwardly facing grill opening;
   (b) a grill for supporting the meat products, the grill being supported across the grill opening;
   (c) a parallel spaced plurality of elongate heating elements spaced below the grill, each of the heating elements comprising a gas burner tube having respective gas emitting ports oppositely inclined laterally outwardly and upwardly for producing a spaced pair of outwardly and upwardly directed flames;
   (d) a plurality of radiant elements spaced between respective ones of the heating elements and the grill for directing heat laterally from above the heating elements, each radiant element comprising:
      (i) a laterally spaced pair of sheet members, respective main portions of the sheet members sloping upwardly and inwardly; and
      (ii) respective flue portions of the sheet members portions extending vertically upwardly from upper extremities of the main portions;
   (e) a plurality of inclined trough members spaced between the grill and respective ones of the radiant elements for preventing grease from dripping on the radiant elements and the heating elements, each trough member having a coolant passage extending between opposite ends of the trough member, the coolant passage having an inlet port at the lower end of the trough member and an outlet port at an upper end of the trough member, the inlet and outlet ports of the coolant passage being laterally centered relative to the trough member, the trough member having a laterally spaced pair of trough surfaces formed therein, the inlet and outlet ports being located proximate upper end extremities of the coolant passage for facilitating maintenance of the coolant passage in a filled condition, the broiler having means for feeding liquid coolant through the coolant passage;
   (f) a plurality of shield elements spaced between the radiant element and the trough member, each of the shield elements comprising a horizontally oriented strip, a pair of downwardly extending lips being formed along respective laterally spaced side extremities of the strip;
   (g) a sloping drip pan spaced below the heating elements and having a plenum chamber formed thereunder;
   (h) a grease collector for collecting grease from a lower extremity of the drip pan;
   (i) a pair of oppositely laterally downwardly sloping chute members for receiving grease from respective ones of the trough surfaces, an exit extremity of each chute member being spaced laterally beyond corresponding side extremities of the heating element and the radiant element for directing grease from the lower ends of the trough members to the drip pan without contacting any of the radiant elements and the heating elements; and
   (j) a first coolant conduit connected between the inlet ports of the trough members and a source of liquid coolant for counterflow of the liquid coolant relative to grease traveling in the trough member toward the lower end thereof; and
   (k) a second coolant conduit having an outlet located in the plenum chamber proximate the lower extremity of the drip pan, the second coolant conduit being connected to the outlet ports of the trough members for feeding the liquid coolant in contact with a bottom surface of the drip pan, the liquid coolant overflowing onto a top surface of the drip pan for washing grease into the grease collector.

21. The broiler of claim 20, further comprising a a heat sensor for sensing temperature of a region proximate the grill, and a thermostatic valve for feeding flammable gas from a pressure source to the burner tubes in response to the heat sensor for controlling heat flow from the heating elements.

* * * * *